(12) United States Patent
Chen et al.

(10) Patent No.: US 10,234,932 B2
(45) Date of Patent: Mar. 19, 2019

(54) METHOD AND APPARATUS FOR A MULTIPLE-PROCESSOR SYSTEM

(71) Applicant: Futurewei Technologies, Inc., Plano, TX (US)

(72) Inventors: Wei Chen, San Diego, CA (US); Tongzeng Yang, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/806,547

(22) Filed: Jul. 22, 2015

(65) Prior Publication Data

US 2017/0024000 A1 Jan. 26, 2017

(51) Int. Cl.
*G06F 1/00* (2006.01)
*G06F 1/26* (2006.01)
(Continued)

(52) U.S. Cl.
CPC .......... *G06F 1/3293* (2013.01); *G06F 1/3243* (2013.01); *G06F 1/3275* (2013.01); *G06F 1/3287* (2013.01); *G06F 1/3296* (2013.01); *G06F 9/46* (2013.01); *Y02D 10/152* (2018.01); *Y02D 10/171* (2018.01); *Y02D 10/172* (2018.01)

(58) Field of Classification Search
CPC ....................................................... G06F 1/32
See application file for complete search history.

(56) References Cited

U.S. PATENT DOCUMENTS 8,601,302 B2 12/2013 Lachwani et al.
8,977,880 B2 3/2015 Chang et al.
(Continued)

FOREIGN PATENT DOCUMENTS

CN 102498451 A 6/2012
CN 102566739 A 7/2012

OTHER PUBLICATIONS

Saint-Laurent et al.; "A 28nm DSP Powered by an On-Chip LDO for High-Performance and Energy-Efficient Mobile Applications"; ISSCC 2014/Session 10/Mobile Systems-On-Chip (SoCs)/10.1; 2014 IEEE International Solid-State Circuits Conference; 3 pages.
(Continued)

*Primary Examiner* — Mohammed H Rehman
(74) *Attorney, Agent, or Firm* — Paul Hashim

(57) ABSTRACT

The present disclosure describes methods, systems, and computer program products for a multiple-processor system. The multiple-processor system includes a plurality of central processing unit (CPU) cores. Each of the plurality of CPU cores is configured to operate in at least one of a plurality of CPU states. The plurality of CPU states includes a low-voltage memory retention (NAP) state, an active state, and a shut-off state. The NAP state includes a sleep state that retains state memory. The multiple-processor system also includes a voltage regulator that is configured to provide a NAP voltage to the plurality of CPU cores. The NAP voltage is sufficient for at least one of the plurality of CPU cores to retain state information and the NAP voltage is lower than an active state voltage. The multiple-processor system further includes a plurality of state control switches. Each of the plurality of state control switches connects the voltage regulator to one of the plurality of CPU cores.

29 Claims, 10 Drawing Sheets

(51) Int. Cl.
  *G06F 1/32*    (2006.01)
  *G06F 1/3293*  (2019.01)
  *G06F 1/3234*  (2019.01)
  *G06F 1/3296*  (2019.01)
  *G06F 1/3287*  (2019.01)
  *G06F 9/46*    (2006.01)

(56) References Cited

U.S. PATENT DOCUMENTS

| | | | |
|---|---|---|---|
| 9,116,692 B1* | 8/2015 | Krein | G06F 1/3203 |
| 2005/0057952 A1* | 3/2005 | Mayega | G05F 1/56 |
| | | | 363/100 |
| 2007/0280026 A1* | 12/2007 | Hunter | G11C 5/143 |
| | | | 365/227 |
| 2009/0243958 A1* | 10/2009 | Matsumoto | G06F 3/1423 |
| | | | 345/1.1 |
| 2010/0115300 A1* | 5/2010 | Wu | G06F 1/08 |
| | | | 713/300 |
| 2010/0182076 A1* | 7/2010 | Mizuno | H03K 19/0016 |
| | | | 327/543 |
| 2010/0296238 A1 | 11/2010 | Mowry et al. | |
| 2011/0249292 A1* | 10/2011 | Hirano | B41J 29/10 |
| | | | 358/1.15 |
| 2011/0291576 A1* | 12/2011 | Wong | H05B 33/0815 |
| | | | 315/210 |
| 2012/0326694 A1* | 12/2012 | Sessions | G05F 3/24 |
| | | | 323/312 |
| 2013/0191667 A1* | 7/2013 | Haj-Yihia | G06F 1/3243 |
| | | | 713/322 |
| 2014/0089375 A1* | 3/2014 | Poornachandran | G06F 1/3293 |
| | | | 709/202 |
| 2014/0181410 A1 | 6/2014 | Kalamatianos et al. | |
| 2014/0189225 A1 | 7/2014 | Conrad et al. | |
| 2014/0266317 A1* | 9/2014 | Sessions | G05F 1/565 |
| | | | 327/102 |
| 2015/0006915 A1* | 1/2015 | Ganesan | G06F 1/26 |
| | | | 713/300 |
| 2015/0052377 A1 | 2/2015 | Jahagirdar et al. | |
| 2015/0121520 A1* | 4/2015 | Tsien | G06F 21/57 |
| | | | 726/22 |
| 2015/0198988 A1* | 7/2015 | Dasnurkar | G06F 1/324 |
| | | | 702/64 |
| 2015/0286236 A1* | 10/2015 | Dornseifer | G05F 3/30 |
| | | | 323/313 |
| 2016/0019442 A1* | 1/2016 | Kobayashi | G06K 15/023 |
| | | | 358/1.15 |
| 2016/0246342 A1* | 8/2016 | Muthukaruppan | G05F 1/59 |

OTHER PUBLICATIONS

Gammie et al; "SmartReflex Power and Performance Management Technologies for 90 nm, 65 nm, and 45 nm Mobile Application Processors"; Proceedings of the IEEE; vol. 98, No. 2, Feb. 2010; 16 pages.

International Search Report from International Application No. PCT/CN2016/090880, dated Oct. 31, 2016.

* cited by examiner

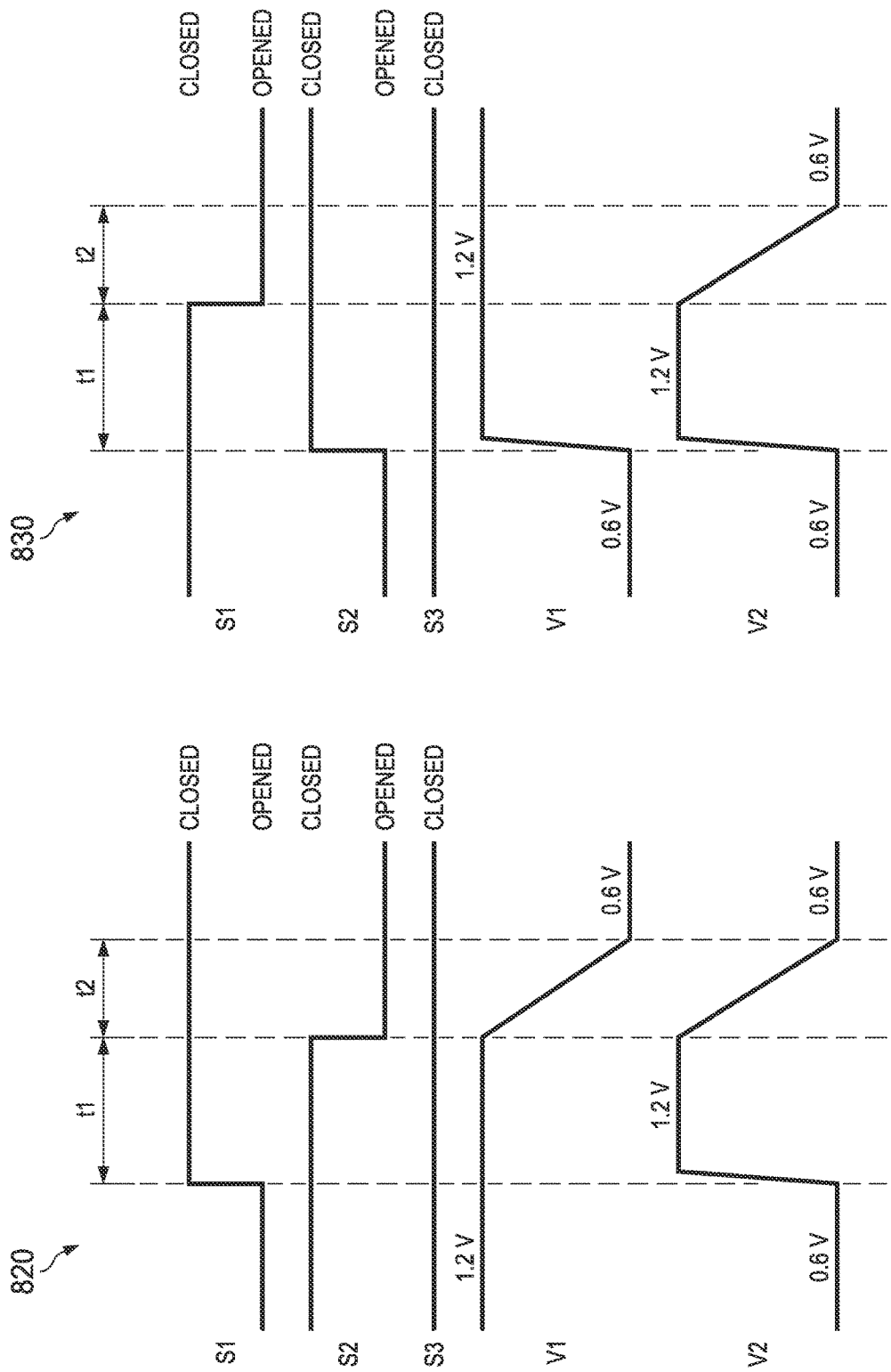

METHOD AND APPARATUS FOR A MULTIPLE-PROCESSOR SYSTEM

TECHNICAL FIELD

This disclosure relates to data transmission in communication systems and, more specifically, to a multiple-processor system that supports a low-voltage memory retention (NAP) state.

BACKGROUND

In some cases, a multiple-processor system may be a computing component that includes two or more independent processing units. These processing units may be referred to as "cores," "Central Processing Units" (CPUs), or "CPU cores." These processing units may read and execute program instructions. The program instructions may include adding, moving data, and branching. In some cases, the multiple-processor system may run multiple instructions at the same time to increase overall speed for the execution of the programs. In some cases, a user equipment may use a multiple-processor system for high-performance and low-power operations. For example, a user equipment may use an MP system that includes 4 or 8 cores.

SUMMARY

The present disclosure is directed to methods, systems, and computer program products for a multiple-processor system. The multiple-processor system includes a plurality of central processing unit (CPU) cores. Each of the plurality of CPU cores is configured to operate in at least one of a plurality of CPU states. The plurality of CPU states includes a low-voltage memory retention (NAP) state, an active state, and a shut-off state. The NAP state includes a sleep state that retains state memory. The multiple-processor system also includes a voltage regulator that is configured to provide a NAP voltage to the plurality of CPU cores. The NAP voltage is sufficient for at least one of the plurality of CPU cores to retain state information and the NAP voltage is lower than an active state voltage. The multiple-processor system further includes a plurality of state control switches. Each of the plurality of state control switches connects the voltage regulator to one of the plurality of CPU cores.

The present disclosure further discloses a method for providing state transitions in a multiple-processor system, wherein the multiple-processor system including a plurality of central processing unit (CPU) cores. The method comprises operating a first CPU core of the multiple-processor system in an active state, wherein the first CPU core is configured to operate in one of a plurality of CPU states, the plurality of CPU states includes a low-voltage memory retention (NAP) state, an active state, and a shut-off state, and the NAP state comprises a sleep state that retains state memory; receiving a NAP voltage from a voltage regulator, wherein the NAP voltage is sufficient for the first CPU core to retain state information and the NAP voltage is lower than an active state voltage, and the voltage regulator is configured to provide a NAP voltage to the plurality of CPU cores of the multiple-processor system; and transitioning, in response to receiving the NAP voltage, the first CPU core from the active state to the NAP state.

The present disclosure also discloses a use equipment (UE). The UE comprises a multiple-processor system comprising a plurality of central processing unit (CPU) cores, wherein each of the plurality of CPU cores is configured to operate in at least one of a plurality of CPU states, the plurality of CPU states including a low-voltage memory retention (NAP) state, an active state, and a shut-off state, wherein the NAP state comprises a sleep state that retains state memory; a voltage regulator that is configured to provide a NAP voltage to the plurality of CPU cores, wherein the NAP voltage is sufficient for at least one of the plurality of CPU cores to retain state information and the NAP voltage is lower than an active state voltage; and a plurality of state control switches, wherein each of the plurality of state control switches connects the voltage regulator to one of the plurality of CPU cores.

Other implementations of this aspect include corresponding user equipments (UEs), apparatuses, computer-implemented methods, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes the system to perform the actions. One or more computer programs can be configured to perform particular operations or actions by virtue of including instructions that, when executed by data processing apparatus, cause the apparatus to perform the actions.

The details of one or more implementations of the subject matter of this specification are set forth in the accompanying drawings and the description below. Other features, aspects, and advantages of the subject matter will be apparent from the description, the drawings, and/or the claims.

DESCRIPTION OF DRAWINGS

FIG. 8B is a timing diagram that illustrates a process for transitioning from an active state to a low-voltage memory retention (NAP) state according to an implementation.

FIG. 8C is a timing diagram that illustrates a process for transitioning from a NAP state to an active state according to an implementation.

Like reference numbers and designations in the various drawings indicate like elements.

DETAILED DESCRIPTION

Figure 1:
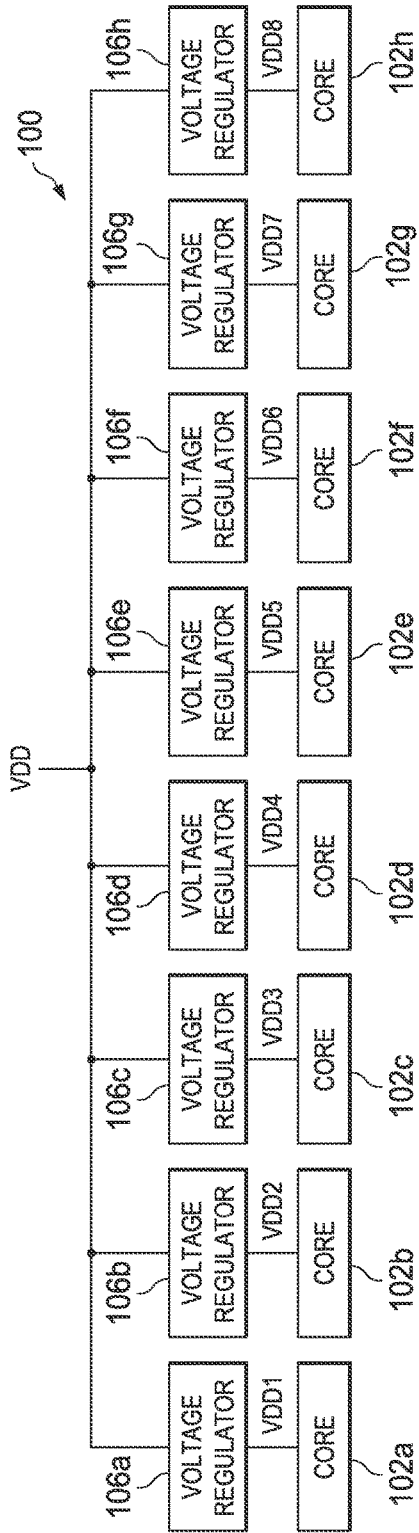
FIG. 1 is a high-level architecture block diagram of a multiple-processor (MP) system with multiple voltage regulators according to an implementation.

The following detailed description is presented to enable any person skilled in the art to make, use, and/or practice the disclosed subject matter, and is provided in the context of one or more particular implementations. Various modifications to the disclosed implementations will be readily apparent to those skilled in the art, and the general principles defined herein may be applied to other implementations and applications without departing from the scope of the disclosure. Thus, the present disclosure is not intended to be limited to the described and/or illustrated implementations but is to be accorded the widest scope consistent with the principles and features disclosed herein.

In some cases, a user equipment (UE) may include a multiple-processor (MP) system. In some cases, a CPU core of the multiple-processor system may operate in different CPU states. For example, a CPU core may operate in an active state. During the active state, the CPU core may execute one or more program functions. In some cases, an active state voltage is supplied to a CPU core that operates in the active state. In some cases, dynamic voltage frequency scaling (DVFS) techniques may be used to provide active state voltage to a CPU core operating in an active state. In a DVFS scheme, a dynamic range of voltage may be provided to a CPU core depending on the task load that the CPU core is executing. For example, if the task load is high, then the active state voltage may be at or near the top of the dynamic range. If the task load is low, then the active state voltage may be at or near the bottom of the dynamic range. In some cases, a CPU core that is supplied with different input voltage is also referred to as a power domain.

In some cases, a CPU core may also operate in a shut_off state. During a shut_off state, the power input to the CPU core may be shut down. Therefore, in a shut_off state, the input voltage to the CPU core may be at or close to 0, and the state information of the CPU core may be lost. The state information of the CPU core may include the logic state, the transistor state, the memory state, or a combination thereof. Operating the CPU cores in the shut_off state may reduce power leakage and improve battery performance of the system. Therefore, in some cases, the multiple-processor system may operate some CPU cores in the active state and some CPU cores in the shut_off state. The multiple-processor system may determine the number of CPU cores operating in the shut_off state based on the current task load of the system. However, because the state information is lost in the shut_off state, the wakeup time to switch a CPU core from a shut_off state to an active state may be long. For example, the wakeup time may include the time to power up the CPU core, reload the state information, and turn on the clock. Therefore, the latency of the system may be increased if the task load of the system increases significantly.

In some cases, a CPU core may operate in a low-voltage memory retention (NAP) state. In some cases, the NAP state may be a sleep state that retains the state information of the CPU core. In some cases, a NAP voltage may be supplied to a CPU core that operates in a NAP state. The NAP voltage may be lower than the active state voltage, and therefore the leakage for the CPU core is reduced. The NAP voltage may also be high enough for the CPU core to retain the state information. Therefore, the wakeup time to switch a CPU core from a NAP state to an active state may be short. In some cases, the wakeup time may include the time to turn on the clock.

In some cases, the UE may operate in ANDROID operation system (OS). In these or other cases, the CPU cores in the multiple-processor system may operate in one of 4 states: C0, C1, C2, C3. The C0 is an active state. A CPU core operating in C0 is executing instructions, while a CPU core operating in C1 does not execute instructions but can do so instantly. A CPU core operating in C2 stops the clock. A CPU core operating in C3 is powered down and not synchronized. In some cases, a CPU core operating in C2 can operate in a NAP state, during which a NAP voltage is supplied and the state information is retained. A CPU core operating in C3 can operate in a shut_off state. Alternatively or additionally, a CPU core operating in C3 can operate in a NAP state, during which a NAP voltage is supplied and the state information is retained.

Turning to a general description, a UE may be referred to as mobile electronic device, user device, mobile station, subscriber station, portable electronic device, mobile communications device, wireless modem, or wireless terminal. Examples of a UE (e.g., the UE 102) may include a cellular phone, personal data assistant (PDA), smart phone, laptop, tablet personal computer (PC), pager, portable computer, portable gaming device, wearable electronic device, or other mobile communications device having components for communicating voice or data via a wireless communication network. The wireless communication network may include a wireless link over at least one of a licensed spectrum and an unlicensed spectrum.

Other examples of a UE include mobile and fixed electronic devices. A UE may include a Mobile Equipment (ME) device and a removable memory module, such as a Universal Integrated Circuit Card (UICC) that includes a Subscriber Identity Module (SIM) application, a Universal Subscriber Identity Module (USIM) application, or a Removable User Identity Module (R-UIM) application. The term "UE" can also refer to any hardware or software component that can terminate a communication session for a user. In addition, the terms "user equipment," "UE," "user equipment device," "user agent," "UA," "user device," and "mobile device" can be used synonymously herein.

In some cases, a voltage regulator may be used to provide active state voltage to a CPU core. In some cases, the voltage regulator may be implemented in a different chip than the CPU core. In some cases, multiple voltage regulators may be used to provide input voltages to multiple CPU cores in an MP system. FIG. 1 is a high-level architecture block diagram of an MP system 100 with multiple voltage regulators according to an implementation. As illustrated, the MP system 100 includes 8 cores 102a-h and 8 voltage regulators 106a-h. As illustrated, each voltage regulator is coupled with a corresponding core. In some cases, the cores 102a-h and the voltage regulators 106a-h can be implemented on the same chip. For example, 102a-h and the voltage regulators 106a-h can be implemented on a single integrated circuit die or multiple dies in a single chip package. In some implementations, a voltage regulator may provide different voltage levels according to the state that the corresponding CPU core operates in. For example, if the core 102a operates in the NAP state, the corresponding voltage regulator 106a may provide a NAP voltage to the core 102a. In some cases, the voltage regulator may include a bypass mode. In the bypass mode, the output voltage level of the voltage regulator may be the same as the input voltage level, e.g., VDD as illustrated in FIG. 1. The voltage regulator may use the bypass mode to provide the active state voltage to the corresponding CPU core.

Figure 2:
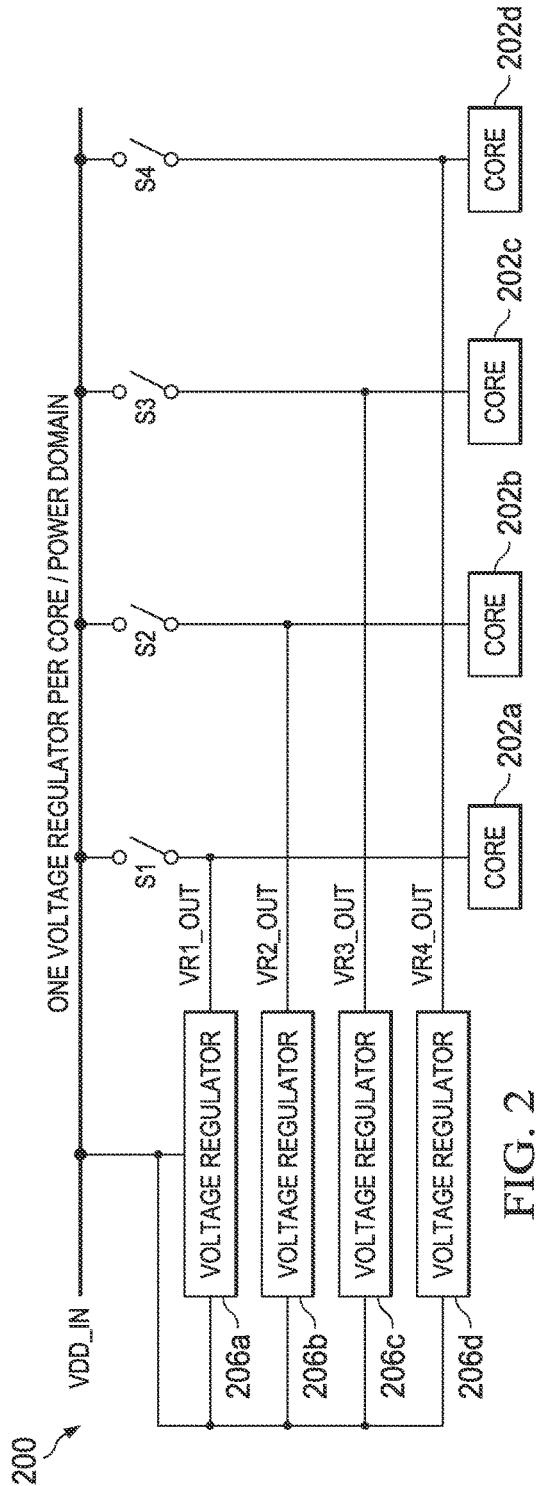
FIG. 2 is a high-level architecture block diagram of an MP system with multiple voltage regulators according to another implementation.

FIG. 2 is a high-level architecture block diagram of an MP system 200 with multiple voltage regulators according to another implementation. As illustrated, the MP system 200 includes 4 cores 202a-d and 4 voltage regulators 206a-d. As illustrated, each voltage regulator is coupled with a corresponding core. Therefore, each voltage regulator can provide a voltage to the corresponding core. Each core is also coupled with a corresponding switch to a voltage source. In some implementations, if a core, e.g., the core 202a illustrated in FIG. 2, operates in the NAP state, the corresponding switch, e.g., S1 illustrated in FIG. 2, is turned to an open position. In this case, the corresponding voltage regulator, e.g., the voltage regulator 206a illustrated in FIG. 2, can provide an output voltage, e.g., VR1_OUT illustrated in FIG. 2, at the NAP state voltage level to the core 202a. If a core operates in the active state, the corresponding switch may be turned to a closed position. Therefore, the voltage source may provide an active state voltage level, e.g., VDD_IN illustrated in FIG. 2, to the core.

In some cases, using multiple voltage regulators to provide input voltages to the CPU cores can increase the hardware overhead of the MP system. The increased hardware overhead may increase the implementation complexity and the cost, in particular for the MP systems that are implemented on the same chip, where the available footprint is limited.

In some cases, a voltage regulator may be used to provide NAP voltages to two or more CPU cores. For example, a multiple-processor system may include at least two central processing unit (CPU) cores. Each of the at least two CPU cores is configured to operate in at least one of a plurality of CPU states. The plurality of CPU states includes a low-voltage memory retention (NAP) state, an active state, and a shut-off state. The NAP state includes a sleep state that retains state memory. The multiple-processor system also includes a voltage regulator that is configured to provide a NAP voltage to the at least two CPU cores. The NAP voltage corresponds to the NAP state. The multiple-processor system further includes a plurality of switches. Each of the plurality of switches connects the voltage regulator to one of the at least two CPU cores.

In some cases, the multiple-processor system includes a digital NAP state controller that is configured to provide a control signal to the voltage regulator and controls an output state transition sequence. The control signal configures an output state of the voltage regulator. The output state represents a combined CPU state of the at least two CPU cores. The output state transition sequence includes a transition between different combined CPU states. In some cases, the output state is selected from a reduced set of combined CPU states.

In some cases, the voltage regulator and the at least two CPU cores are implemented on the same chip. In some cases, the voltage regulator is a low-dropout-voltage-regulator (LDO). In some cases, the voltage regulator is a capless voltage regulator. In some cases, the voltage regulator is configured to provide a bypass voltage to the first and the second CPU cores, and the bypass voltage corresponds to a transient state.

In some cases, the multiple-processor system is implemented in a 4-core architecture or an 8-core architecture. In some cases, the multiple-processor system is implemented in a big.LITTLE architecture. The multiple-processor system includes at least two big CPU cores and at least two little CPU cores. In some cases, the voltage regulator is configured to provide a NAP voltage to at least one big CPU core and at least one little CPU core. In some cases, the voltage regulator is configured to provide a NAP voltage to the at least two big CPU cores, and the multiple-processor system further includes an additional voltage regulator that is configured to provide a NAP voltage to the at least two little CPU cores. In some cases, the multiple-processor system operates in ANDROID operating system (OS). In some cases, the multiple-processor system includes a dynamic symmetric multiprocessing (SMP)-asymmetric multiprocessing (ASMP) switching system. In some cases, the multiple-processor system includes an SMP. In some cases, the multiple-processor system comprises an ASMP.

In some cases, the MP system described herein may provide one or more advantages. For example, using one voltage regulator to provide input voltages to multiple CPU cores can reduce the overhead for the MP system and, therefore, reduce the implementation complexity of the system. Furthermore, using a digital NAP state controller may further reduce the wakeup time and improve the speed performance of the multiple-processor system. In addition, using a voltage regulator that provides a bypass voltage may reduce transient noise in the multiple-processor system during the state transitions. Other advantages will be apparent to those of ordinary skill in the art.

Figure 3:
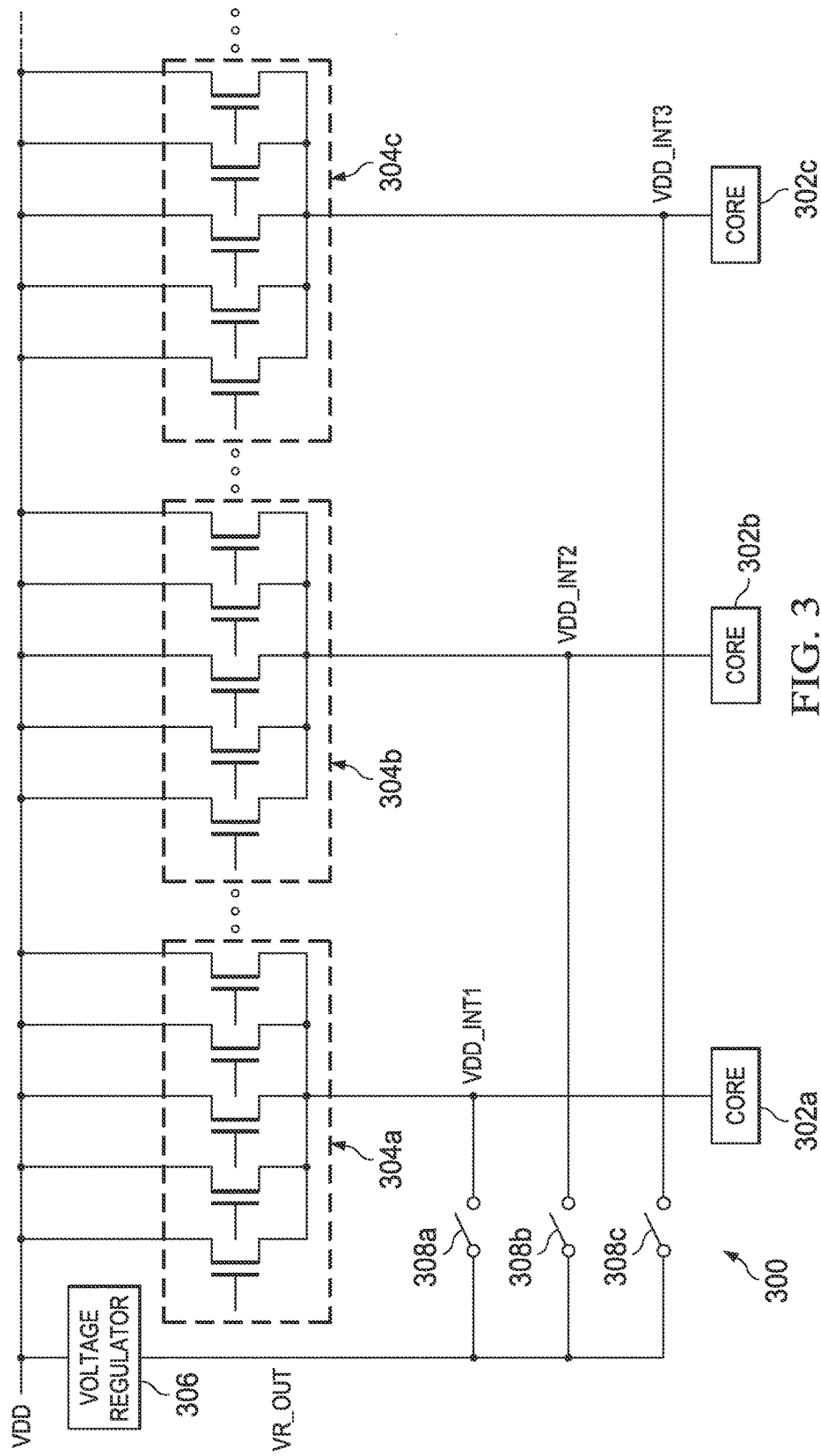
FIG. 3 is a high-level architecture block diagram of an MP system that uses one voltage regulator to provide voltages for multiple central processing unit (CPU) cores according to an implementation.

FIG. 3 is a high-level architecture block diagram of an MP system 300 that uses one voltage regulator to provide voltages for multiple CPU cores according to an implementation. The MP system 300 includes cores 302a-c. As illustrated, the cores 302a-c are coupled with header switches 304a-c, respectively. The MP system 300 also includes a voltage regulator 306 that provides voltages to the cores 302a-c through state control switches 308a-c.

Each of the cores 302a-c can include one or more processing components (alternatively referred to as "processors" or "central processing units" (CPUs)) configured to execute instructions related to one or more of the processes, steps, or actions described above in connection with one or more of the implementations disclosed herein. In some implementations, the cores 302a-c may be configured to execute program instructions such as adding, moving data, and branching. In some implementations, the cores 302a-c may be configured to generate control information for a UE, such as a measurement report, or respond to received information, such as control information from a network node. The cores 302a-c may also be configured to make a radio resource management decisions such as cell selection/reselection information or triggering a measurement report for a UE.

As discussed previously, each of the cores 302a-c may operate in one of the CPU states. The CPU states may include a shut-off state, an active state, or a NAP state. In some cases, each of the cores 302a-c may switch from one CPU state to a different CPU state. The cores 302a-c may operate in the same CPU state or different CPU states.

The header switches 304a-c include any electronic circuit elements that are configured to connect the cores 302a-c with a supply voltage VDD. In some cases, as illustrated, the header switches 304a-c may be implemented using distributed header switches. Alternatively or in combination, the header switches 304a-c may be implemented using block header switches. In some cases, e.g., when a core operates in an active state, the associated header switch may be closed. Because the supply voltage VDD is provided to the header switches, when the header switch is closed, the input voltage of the core may be equal to VDD.

In some cases, VDD is provided by a power management integrated circuit (PMIC) chip. In some cases, the PMIC may be implemented on the same chip as the MP system 300. Alternatively, the PMIC may be implemented on a different chip than the MP system 300. In some cases, the PMIC may set VDD to the voltage level for a core that operates in an active state. In some cases, a core may operate in an active state using DVFS and, therefore, the VDD may be set within the DVFS range.

As illustrated, the MP system 300 includes the voltage regulator 306. The voltage regulator 306 is configured to provide a voltage VR_OUT to the cores 302a-c. In some cases, the VR_OUT is set to a retention level for a core to operate in a NAP state. In some implementations, the retention level may be much lower than VDD but still sufficient for a core to retain memory its logic and memory states.

In some cases, the voltage regulator 306 may be implemented using an LDO. An LDO is a direct current (DC) linear voltage regulator. In some cases, the LDO can be configured to regulate an output voltage when the LDO receives an input voltage that is close to the output voltage. Using an LDO may reduce switching noise and system footprint and complexity. Alternatively, the voltage regulator 306 may be implemented using other alternating (AC) or DC voltage regulators.

In some cases, the voltage regulator 306 and the cores 302a-c may be implemented on the same chip. For example, the voltage regulator 306 and the cores 302a-c may be implemented on a single integrated circuit die, or onto multiple dies in a single chip package. This approach may save the footprint of the MP system 300 and increase system performance. In some cases, the voltage regulator 306 may be implemented using a capless LDO. A capless LDO may be an LDO that does not include an external capacitor. For example, the voltage regulator 306 may not be connected to another capacitor outside of the chip where the voltage regulator 306 resides. Using a capless LDO may further reduce the footprint of the MP system 300.

As illustrated, the MP system 300 includes the state control switches 308a-c. The state control switches 308a-c include any electronic circuit elements that are configured to connect the cores 302a-c with the voltage regulator 306. In operation, when a core operates in a NAP state, the associated state control switch may be closed. When the state control switch is closed, the input voltage of the core may be equal to VR_OUT. In some cases, VR_OUT is much lower than the lower end of the DVFS range that is supplied by VDD. Therefore, substantial leakage reduction may be provided. On the other hand, VR_OUT may be equal to or higher than the retention voltage level that is required to retain state information in the core. Therefore, the state information of the cores 302a-c may be retained when the state control switches 308a-c are closed.

For example, when the core 302a operates in active state, the header switch 304a is closed and the state control switch 308a is open. The input voltage VDD_INT1 is equal to VDD. When the core 302a operates in a NAP state, the header switch 304a is open and the state control switch 308a is closed. The input voltage VDD_INT1 is equal to VR_OUT. When the core 302a operates in a shut_off state, both the associated header switch 304a and the associated state control switch 308a are open, and the VDD_INT1 is equal to 0.

Figure 8A:
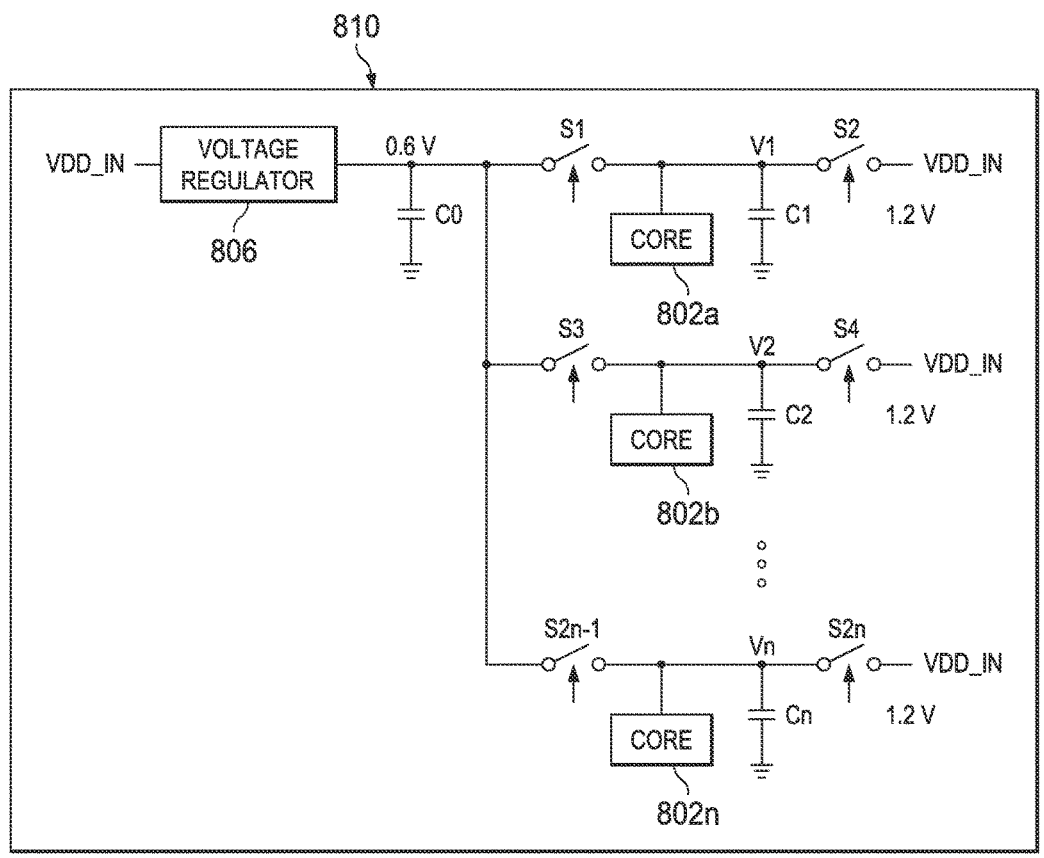
FIG. 8A is a high-level architecture block diagram of an MP system that transitions between different states according to an implementation.

In some cases, the voltage regulator 306 may include a bypass mode. During the bypass mode, the voltage regulator 306 may provide a bypass voltage to the cores 302a-c. In some cases, the bypass voltage may be set to VDD. FIGS. 8A-8C and associated descriptions provide additional details of these implementations.

In some cases, the voltage regulator 306 may be configured to operate in an example configuration. The example configuration may include the following example parameters: current between about 10 mA to about 600 mA, voltage input about 0.6-0.8V, voltage output about 0.8-1.1V, minimum dropout voltage about 100 mV, voltage output accuracy about 5%, power supply rejection ratio about 40-45, settling time about 0.1 us, output capacitor greater than about 1 nF, transient current about 50 mA per 50 ns, and etc. In some cases, the voltage regulator 306 may be implemented using resistive-capacitive (RC)-delay slow-start techniques. In some cases, the voltage regulator 306 may be implemented using optimized 16 nm FinFet transistors.

In some cases, as illustrated in FIG. 3, the MP system 300 may operate in a symmetric multiprocessing (SMP) configuration. In an SMP system, the cores 302a-c may operate with the same clock frequency and the same voltage supply. For example, the supply voltage VDD may be common to the cores 302a-c. In some cases, the MP system 300 may operate in an asymmetric multiprocessing (ASMP) configuration. In an ASMP system, the cores 302a-c may operate with different clock frequencies, different voltage supplies, or a combination thereof. For example, a supply voltage VDD1 may be provided to the header switch 304a that is coupled to the cores 302a, while a different supply voltage VDD2 may be provided to the header switches 304b-c that are coupled to the cores 302b-c, respectively. Therefore, the cores 302b-c operating in an active state may be provided with a different voltage level than the core 302a operating in an active state.

In some cases, the MP system 300 may operate in a dynamic SMP-ASMP switching configuration. In a dynamic SMP-ASMP switching configuration, the MP system 300 may switch between an SMP mode, where the supply voltages to the cores 302a-c are the same, to an ASMP mode, where the supply voltages to the cores 302a-c are different. In some cases, the dynamic SMP-ASMP switching system may provide an efficient power management scheme for the MP system 300 to execute applications with different processing loads.

Figure 4:
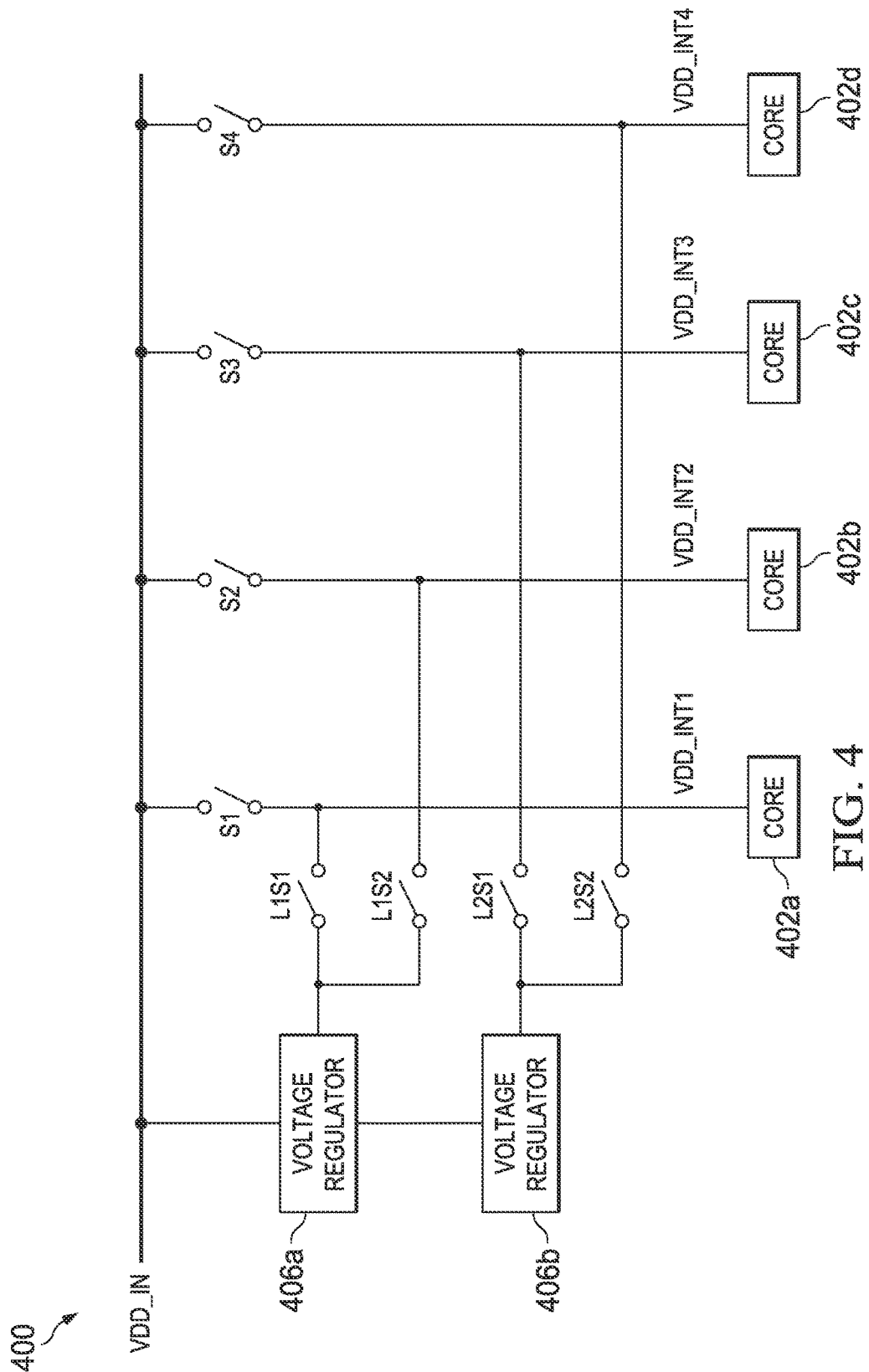
FIG. 4 is a high-level architecture block diagram of an MP system that uses two voltage regulators to provide input voltages for four CPU cores according to an implementation.

In some cases, more than one voltage regulator can be used to provide input voltages for the MP system. FIG. 4 is a high-level architecture block diagram of an MP system 400 that uses two voltage regulators to provide input voltages for four CPU cores according to an implementation. As illustrated, the MP system 400 includes cores 402a-d and voltage regulator 406a-b. As illustrated, the cores 402a-d are coupled with header switches S1-S4, respectively. The voltage regulator 406a provides NAP voltages to the cores 402a-b through state control switches L1S1 and L1S2, respectively. The voltage regulator 406b provides NAP voltages to the cores 402c-d through state control switches L2S1 and L2S2, respectively.

Figure 5:
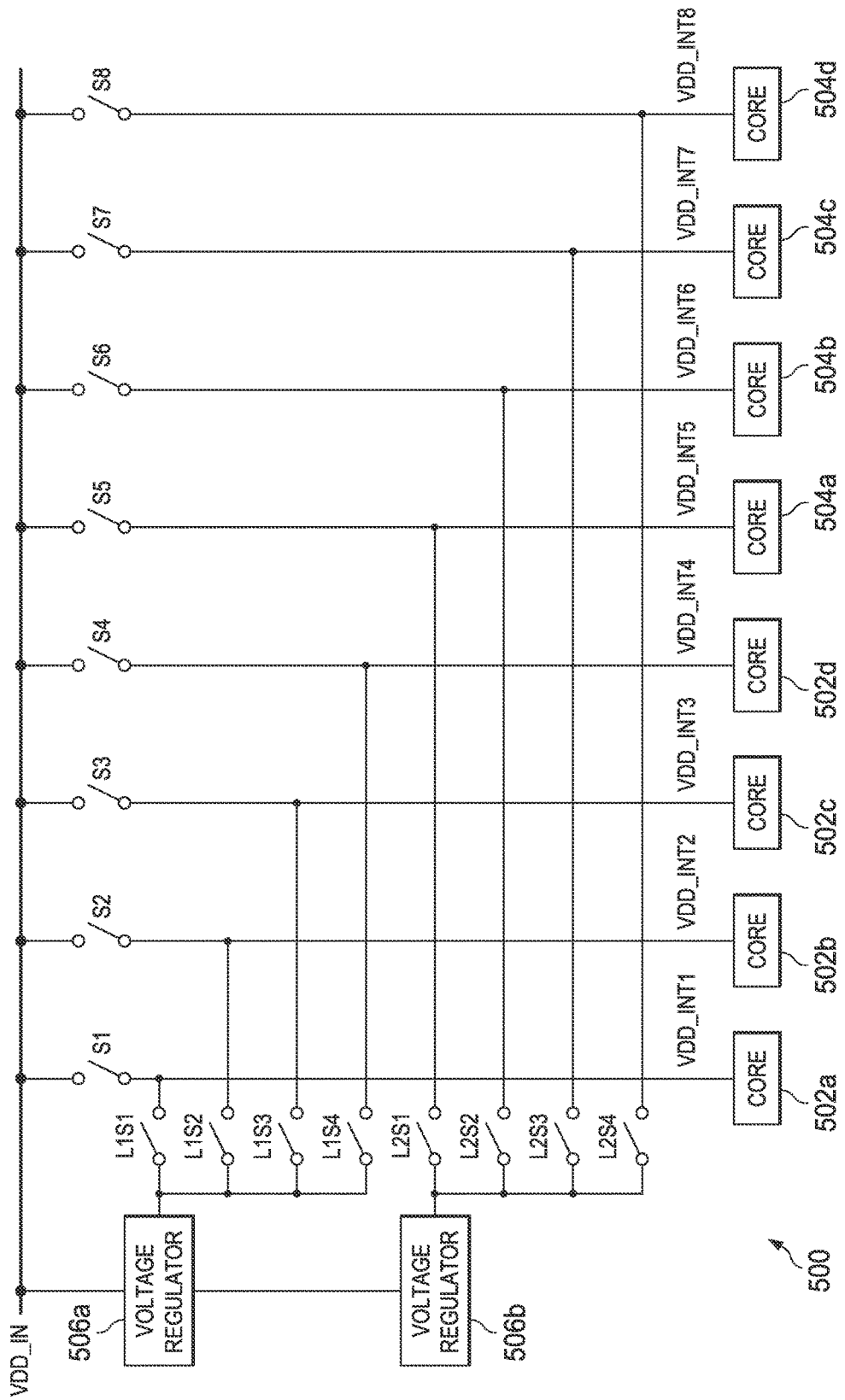
FIG. 5 is a high-level architecture block diagram of an MP system that is implemented in a big.LITTLE architecture according to an implementation.

FIG. 5 is a high-level architecture block diagram of an MP system 500 that is implemented in a big.LITTLE architecture according to an implementation. In some cases, the big.LITTLE architecture can be used to implement an MP system. A big.LITTLE architecture is a heterogeneous computing architecture that includes different types of CPU cores. The different types of CPU cores can include a big CPU core, which is a type of high-performance CPU core. The big CPU core may provide powerful computing performance, while consuming a high-level of power. The different types of CPU cores can also include a little CPU core, which is a type of low-performance CPU core. The little CPU core may be more power efficient, while providing limited computing performance. Using the big.LITTLE architecture can enable the MP system to adjust dynamically to the computing needs and use less power than clock scaling alone. Examples of the big.LITTLE architecture include the ARM big.LITTLE architecture.

Referring to FIG. 5, the MP system 500 includes big cores 502a-d, little cores 504a-d, and voltage regulator 506a-b. As illustrated, the big cores 502a-d are coupled with header switches S1-S4, respectively. The big cores 502a-d may form a cluster. The little cores 504a-d are coupled with header switches S5-S8, respectively. The little cores 504a-d may form another cluster. As illustrated, a voltage regulator, e.g., the voltage regulator 506a, may provide NAP voltage to the big cores 502a-d through state control switches L1S1-4, respectively. Another voltage regulator, e.g., the voltage regulator 506b, may provide NAP voltage to the little cores 504a-d through state control switches L2S1-4, respectively.

Alternatively or in combination, a voltage regulator may provide NAP voltages to a big core and a little core. For example, the voltage regulator 506a may be coupled to the big core 502a and the little core 504a through state control switches L1S1 and L1S2 respectively. In this example, the voltage regulator 506a may provide NAP voltages to the big core 502a and the little core 504a.

In some cases, a voltage regulator may operate in multiple states. Each state may correspond to a combined CPU state of the cores to which the voltage regulator provides NAP voltages. For example, if a core may operate in any one of the active states, the NAP state, and the shut_off state, thus the number of the CPU states is 3. If a voltage regulator provides NAP voltage to 3 cores, then there may be 27 combined CPU states, each representing a permutation of the CPU states for the 3 cores. Each combined CPU state corresponds to a combination of output voltages provided by the voltage regulator. The following provides an example denotation of these states.

For example, we denote S for shut-off state, N for NAP state, and A for active state. For a 3-core MP system, an example combined CPU state may be represented as "ANN," where "ANN" represents core1 at active state and core2 and core3 at NAP state. Other example combined CPU states may include "AAN," "NSS," or etc.

When the MP system operates in a turbo mode, the combined CPU state may be "AAA." If the cores use DVFS, the VDD for the cores may be set at the top range of the DVFS range. When the MP system operates in a two-processor mode, the combined CPU state may be "AAS," or in some cases, "ANS" or "NNS" for power saving and quick resuming operations.

Figure 6A:
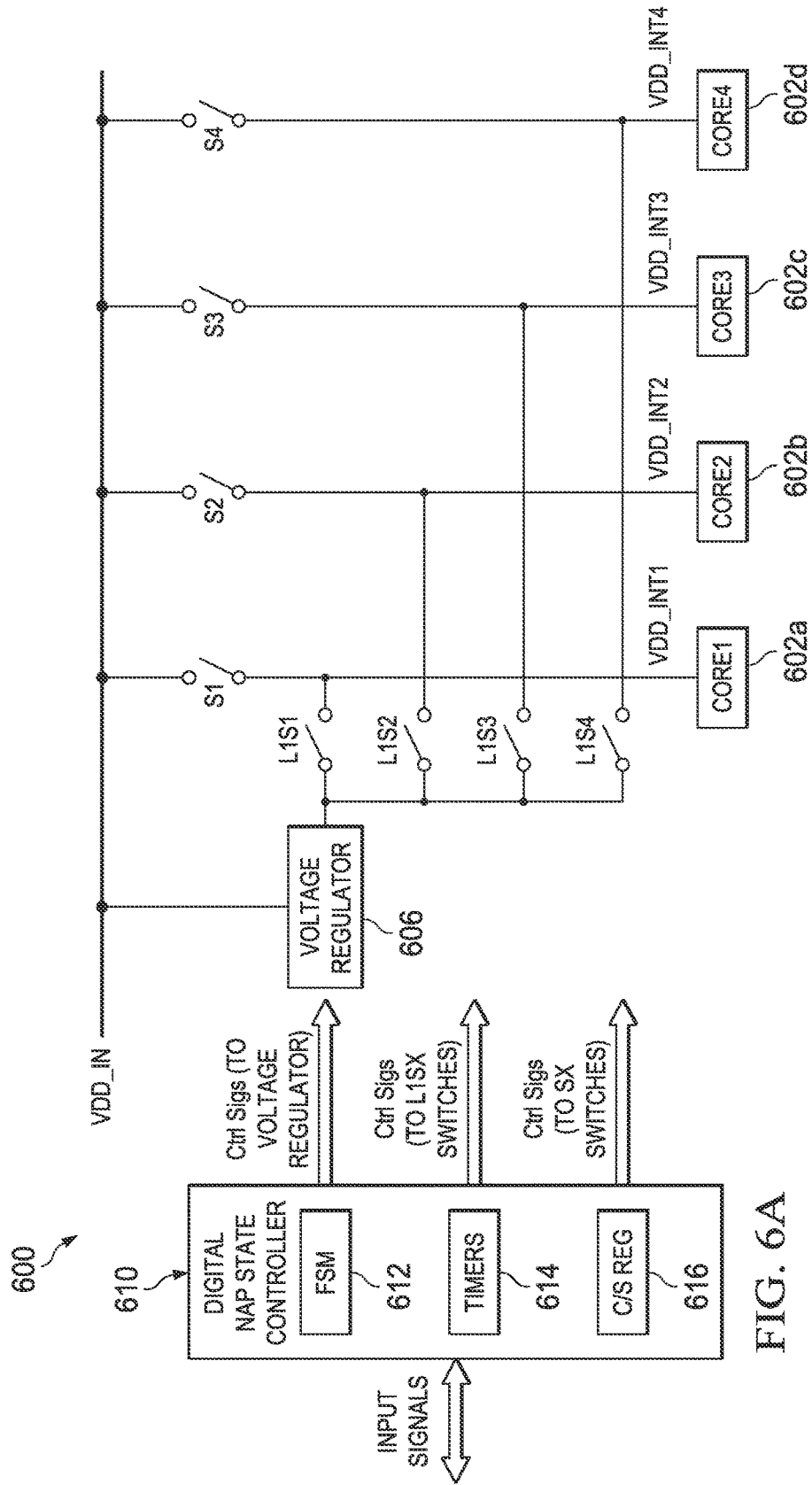
FIG. 6A is a high-level architecture block diagram of an MP system that includes a digital NAP state controller according to an implementation.

In some cases, the states of the voltage regulator can be controlled by software. Alternatively or additionally, the states of the voltage regulator and the output voltages can be controlled by hardware, e.g., a digital NAP state controller. FIG. 6A is a high-level architecture block diagram of an MP system 600 that includes a digital NAP state controller according to an implementation.

As illustrated, the MP system 600 includes cores 602a-d and a voltage regulator 606. As illustrated, the cores 602a-d are coupled with header switches S1-S4, respectively. The voltage regulator 606 provides NAP voltages to the cores 602a-d through state control switches L1S1-4, respectively.

The MP system 600 also includes a digital NAP state controller 610. The digital NAP state controller 610 represents one or more hardware circuit elements that can be configured to provide control signals to the voltage regulator 606, state control switches L1S1-4, header switches S1-4, or a combination thereof. The control signals configure the output voltages of the voltage regulator 606 and the open/close positions of the state control switches L1S1-4 based on the combined CPU states of the cores 602a-d. In one example, the combined CPU state of the cores 602a-d is "ANNS." In this example, the cores 602b-c operate in NAP state. Therefore, the control signals may configure state control switches L1S2 and L1S3 to be at the close position, the header switches S2-S3 to be at the open position, and the voltage regulator 606 to provide NAP voltages to cores 602b-c. The core 602a operates in the active state. The control signals may configure state control switches L1S1 to be at the open position and the header switches S1 to be at the close position. The core 602d operates in shut_off state. The control signals may configure state control switches L1S4 and the header switches S4 to be at the open position.

The digital NAP state controller 610 includes a finite state machine (FSM) 612, timers 614, and configuration/status registers 616. The FSM 612 represents one or more hardware circuit elements that can be configured to sequence control signals with timing delays in between. In some cases, using an FSM may increase processing speed and reduce interventions from software or operating systems. In the event of exceptions, e.g., timeout, etc., an FMS may generate an interrupt to the CPU cores.

In some cases, the digital NAP state controller 610 may provide control signals during the state transitions of the combined CPU states. For example, the control signals may configure a transient state operation for a core that switches between states. During the transient state operation, the voltage regulator 606 may provide a bypass voltage to a core for a short duration and the associated state control switch may change from a closed position to an open position, or from an open position to a closed position. In some cases, the FSM 612 may receive input signals that indicate the current and the next combined CPU state. The FSM 612 may provide control signals to the voltage regulator 602 and the associated state control switches for both the steady state configuration and the transient state operation based on the current and the next combined CPU state. FIGS. 8A-8C and associated descriptions provide additional details of the transient state operations.

The timers 614 represent one or more hardware circuit elements that can be configured to set the timing intervals that correspond to the state transitions discussed above. The timers 614 may provide the timing information to the FSM 612. The configuration/status registers 616 represent one or more hardware circuit elements, software, or a combination thereof that can be configured to set the function of the digital NAP state controller 610. In some cases, the configuration/status registers 616 may be configured to report the status of the digital NAP state controller 610.

Using hardware implementation, e.g., a digital NAP state controller discussed above, to provide control signals to a voltage regulator may provide a fast switching performance. In some cases, switching performance of a hardware implementation may be about 10 times faster than using software implementations. The low switching latency provided by the hardware implementation may be significant in providing a fast wakeup time for NAP states, which may be on the order of 100-200 clock cycles.

In some cases, some of the cores 602a-d may not support NAP states. In these or other cases, the digital NAP state controller 610 may include two FSMs. One FSM may be used to provide control signals for cores that support NAP states. The other FSM may be used to provide control signals for cores that do not support NAP states.

Figure 6B:
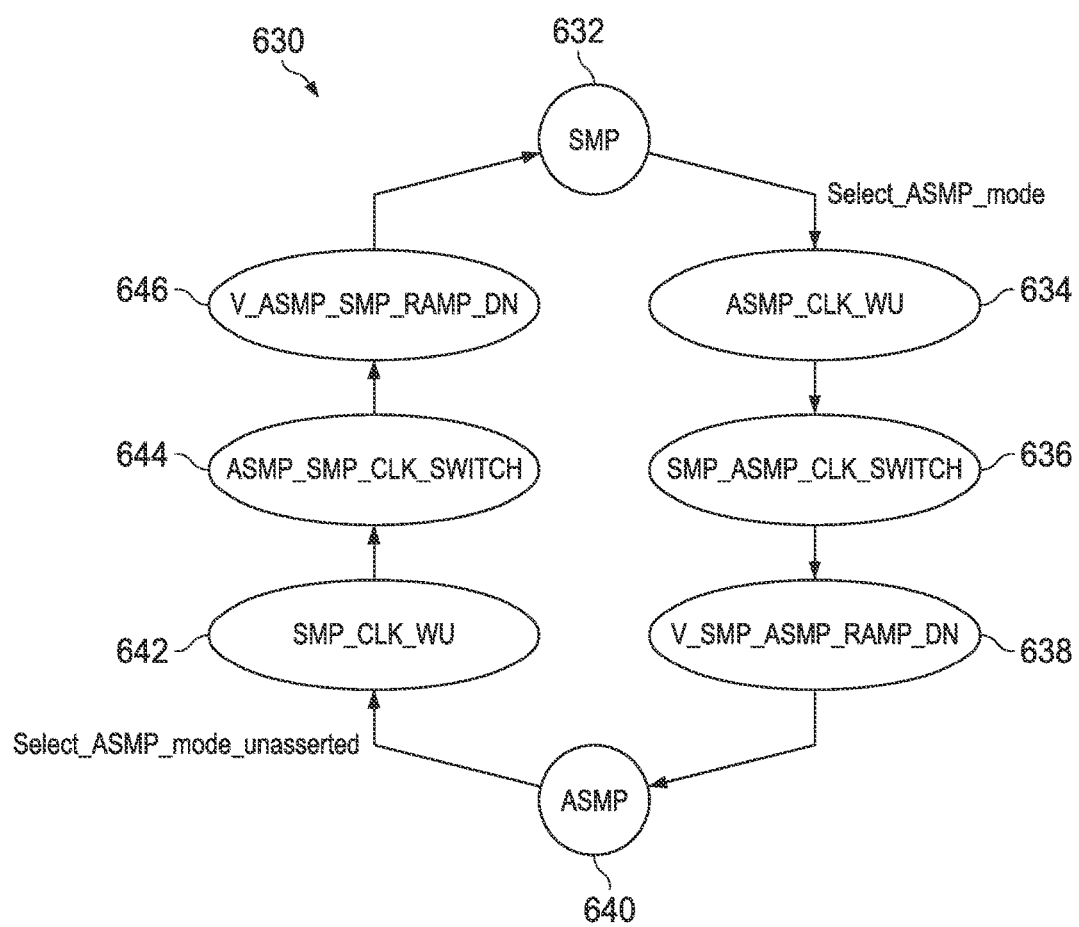
FIG. 6B is a high level block diagram illustrating an example SMP-ASMP state transition process according to an implementation.

In some cases, an FSM, e.g., the FSM 612, may be configured to support dynamic SMP-ASMP switching. FIG. 6B is a high level block diagram illustrating an example SMP-ASMP state transition process 630 according to an implementation. The process starts in state 632, where the FSM operates in the SMP mode. When a switching command, e.g., SELECT_ASMP_MODE is received, the FSM enters in state 634 (ASMP_CLK_WU), where the ASMP clocks are enabled and activated using the ASMP clock enable signal and warmed up. After a predetermined warm-up time period, the operating voltage supplies for different CPU cores may be increased to a predetermined maximum voltage level, e.g., VDD_MAX. The predetermined maximum voltage level may be equal to or greater than the highest voltage level that any of the CPU cores in a MP system may operate in the ASMP mode.

The process 630 proceeds from state 634 to state 636 (SMP_ASMP_CLK_SWITCH), where the clock switching signal is asserted and the clocks of the CPU cores and associated memory are switched from the SMP clock signal to the ASMP clock signals.

The process 630 proceeds from state 636 to state 638 (V_SMP_ASMP_RAMP_DN), where the operating voltage supplies for each CPU core may be ramped down from the predetermined maximum voltage level to the operating voltage of the respective CPU core. The process 630 proceeds from state 638 to state 640, where the FSM operates in the ASMP mode.

When a switching command, e.g., SELECT_ASMP_MODE—unasserted, is received, the process 630 proceeds to state 642 (SMP_CLK_WU), where the SMP clock is enabled and activated using the SMP clock enable signal and warmed up. After a predetermined warm-up time period, the operating voltage supplies for different CPU cores may be increased to a predetermined maximum voltage level, e.g., VDD_MAX. In some cases, the predetermined maximum voltage level may be equal to or greater than the highest voltage level that any of the CPU cores in a MP system may operate in the ASMP mode. In some cases, the operating voltage supplies for different CPU cores may be further increase to the operating voltage level of the SMP mode, e.g., V_SMP, if V_SMP is greater than VDD_MAX.

The process 630 proceeds from state 642 state 644 (ASMP_SMP_CLK_SWITCH), where the clock switching signal is asserted and the clocks of the CPU cores and associated memory are switched from the ASMP clock signals to the SMP clock signal.

The process 630 proceeds from state 644 to state 646 (V_ASMP_SMP_RAMP_DN), where the operating voltage supplies for the CPU cores may be ramped down to V_SMP if V_SMP is lower than VDD_MAX. The process 630 proceeds from state 646 to state 632, where the FSM operates in the SMP state.

Alternatively or in combination, a FSM that is different than the FSM 612 may be configured to support the state transitions of the ASMP-AMP switching discussed above.

In some cases, the combined CPU states can be reduced to simply the implementation of the digital NAP state controller 610. For example, a reduced set of combined CPU states may be used. The reduced set may to exclude repeated permutations. For example, there may be 27 combined CPU states for 3 cores. A reduced set may include 8 combined CPU states. Following is a list of an example reduced CPU states for 3 CPU cores: "AAA," "AAN," "AAS," "ANN," "ANS," "ASS," "NSS," "SSS."

Figure 7:
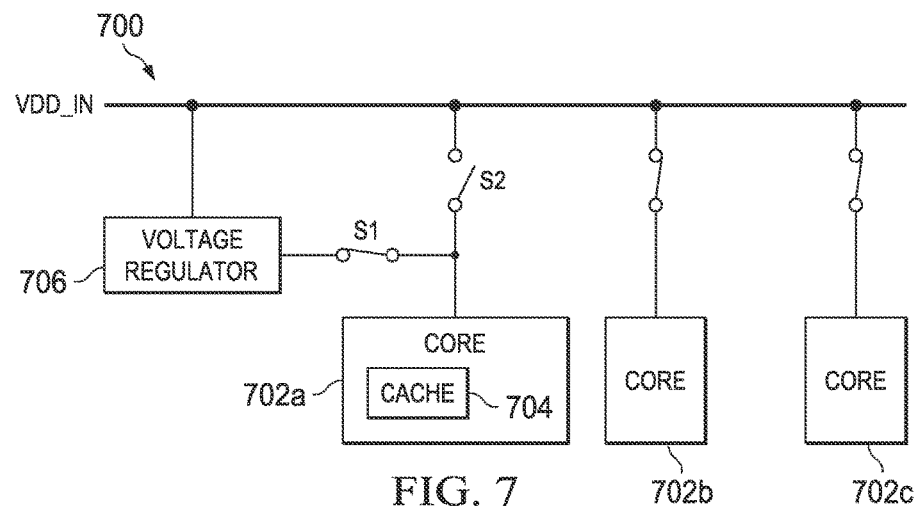
FIG. 7 is a high-level architecture block diagram of an MP system that accesses cache data between CPU cores according to an implementation.

FIG. 7 is a high-level architecture block diagram of an MP system 700 that accesses cache data between CPU cores according to an implementation. In some cases, one CPU core may access data that is stored in a cache of another CPU core. In the illustrated example, the MP system 700 includes cores 702a-c and a voltage regulator 706 that provides NAP voltage to the core 702a through a switch S1. The core 702a includes a cache 704. The cache 704 represent a hardware, software, or a combination thereof that is configured to store data.

In the illustrated example, the cores 702b and 702c operate in active state. The core 702a operates in the shut_off state with both switches S1 and S2 are open. In operation, the core 702b attempts to access cache 704 on the core 702a to read or write data. In some cases, the switch S2 may be closed so that the core 702a can be transitioned into an active state for the core 702b to access the cache 704. Alternatively, the switch S1 may be closed while the switch S2 remains open. In this case, the voltage regulator 706 may provide a bypass voltage to the core 702a. The bypass voltage may be at or close to an active state voltage. The core 702a may operate in a transient state and the core 702b may access the cache 704 without fully transitioning the core 702a to the active state. Using a bypass voltage in this case may provide a small latency for the core 702b to access the data on the cache 704. In some cases, the latency may be reduced to about 100 clock cycles. FIGS. 8A-8C and associated descriptions provide additional details of the transient state operations.

FIG. 8A is a high-level architecture block diagram of an MP system 810 that transitions between different states according to an implementation. As illustrated, the MP system 810 includes cores 802a-n and a voltage regulator 806. The voltage regulator 806 provides NAP voltages to the cores 802a-n. In some cases, the voltage regulator 806 also provides a bypass voltage to the cores 802a-n during the state transition. Using a bypass voltage during the transition period may reduce the transient noise created by the fluctuations of the input voltages to the cores 802a-n.

FIG. 8B is a timing diagram 820 that illustrates a process for transitioning from an active state to a NAP state according to an implementation. As shown in FIG. 8B, before the transition, S1 is open and S2 is closed; therefore, the core 802a operates in the active state. S3 is closed and the core 802b operates in the NAP state. The input voltage V1 to the core 802a is at 1.2V, which corresponds to the active voltage. The output voltage of the voltage regulator 806 is 0.6V, which corresponds to the NAP voltage. When the core 802a switches to the NAP state, during a first transition period T1, S1 switches to the closed position, while S2 remains closed. During T1, the voltage regulator 806 provides a bypass voltage. In some cases, the bypass voltage may be close to or equal to the active voltage. In the illustrated example, the bypass voltage is 1.2V. Therefore, during T1, V1 stays at 1.2V while V2 moves from 0.6V to 1.2V. During the second transition period T2, S2 switches to open while the voltage regulator 806 reduces its output voltage from the bypass voltage 1.2V to the NAP voltage 0.6V. After T2, both V1 and V2 go to 0.6V and the cores 802a-b operate in the NAP state. In some cases, the duration of T1 and T2 may be about 0.5 us. As discussed previously, in some cases, a digital NAP state controller may be configured to provide control signals to the switches S1 and S2 and the voltage regulator 806 to execute these state transition sequences.

FIG. 8C is a timing diagram 830 that illustrates a process for transitioning from a NAP state to an active state according to an implementation. As shown in FIG. 8C, before the transition, S1 is closed and S2 is open; therefore, the core 802a operates in the NAP state. S3 is closed and the core 802b operates in the NAP state. The output voltage of the voltage regulator 806 is 0.6V, which corresponds to the NAP voltage. When the core 802a switches to the active state, during a first transition period T1, S2 switches to the closed position, while S1 remains closed. During T1, the voltage regulator 806 provides a bypass voltage. Therefore, during T1, both V1 and V2 move from 0.6V to 1.2V. During the second transition period T2, S1 switches to open, while the voltage regulator 806 reduces its output voltage from the bypass voltage 1.2V to the NAP voltage 0.6V. V1 stays at 1.2V while V2 moves from 1.2V to 0.6V. After T2, V1 stays at 1.2V and the core 802a operates in the active state. V2 stays at 0.6V and the core 802b remains in the NAP state.

Figure 9:
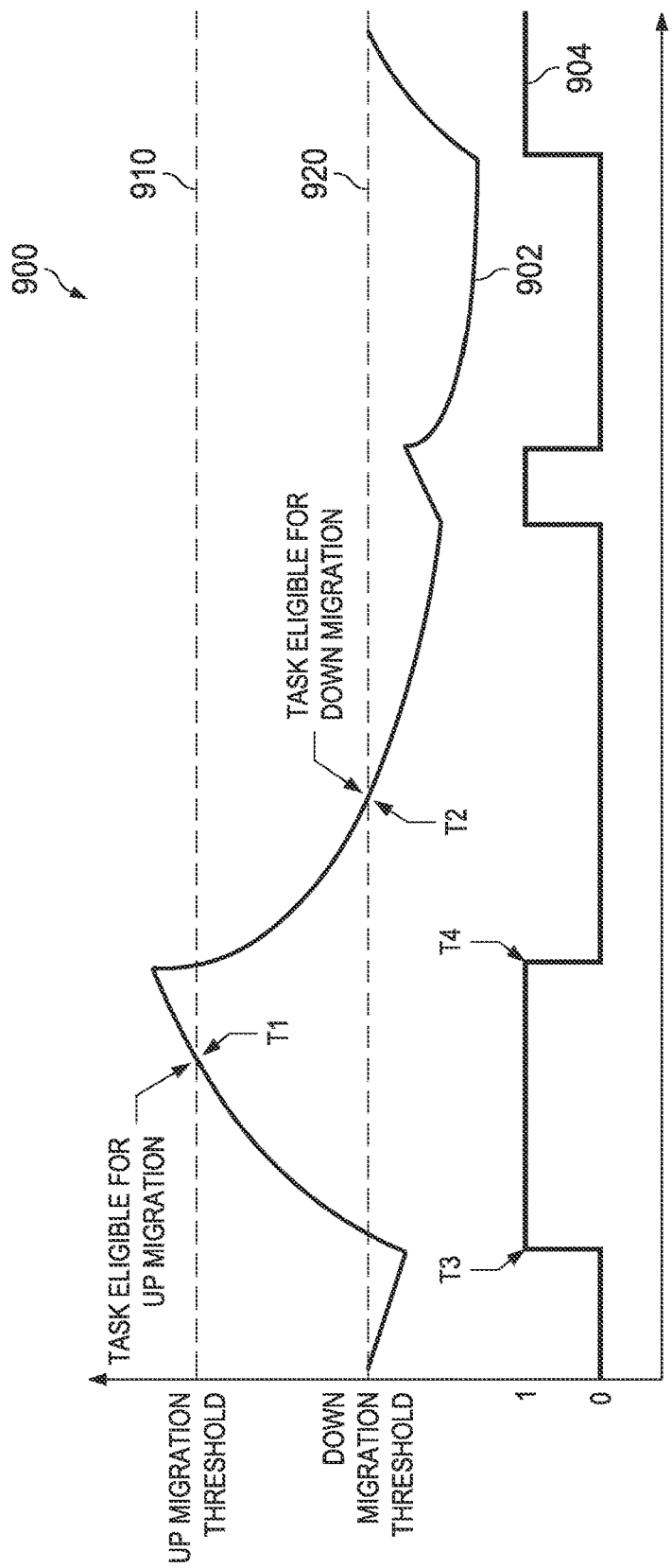
FIG. 9 is a chart that illustrates a process for transitioning between CPU states according to an implementation.

FIG. 9 is a chart 900 that illustrates a process for transitioning between CPU states according to an implementation. In some cases, the decisions to transition between CPU states for a core may be made based on the task load or the queue length for the core. In some cases, a scheduler may be used to make the state transition decisions. For example, in some cases, a scheduler may make the decision based on predetermined load thresholds. The chart 900 includes a task load curve 902, an up-migration threshold 910, and a down-migration threshold 920. As illustrated, at T1, the task load curve 902 exceeds the up-migration threshold 910, and therefore, the scheduler may determine to switch a core from the NAP state to the active state. At T2, the task load curve 902 is below the down-migration threshold 920, and therefore, the scheduler may determine to switch a core from the active state to the NAP state.

In some cases, the derivative of the load may also be tracked. The chart 900 also includes a task derivative curve 904. In some cases, the task derivative curve 904 may be set based on the sign of the derivative of the task load curve 902. For example, as illustrated, at T3, the task load begins to increase and the derivative of the task load curve 902 turns positive. Therefore, the task derivative curve 904 may be set to 1. At T4, the task load begins to decrease and the derivative of the task load curve 902 turns negative. Therefore, the task derivative curve 904 may be set to 0. In some cases, the scheduler may determine a state transition based on both the task load and the derivative of the task load. For example, a scheduler may determine a CPU score to switch from a NAP state to an active state if the task load exceeds the up-migration threshold 910 and the derivative of the task load is positive for a predetermined duration.

Figure 10:
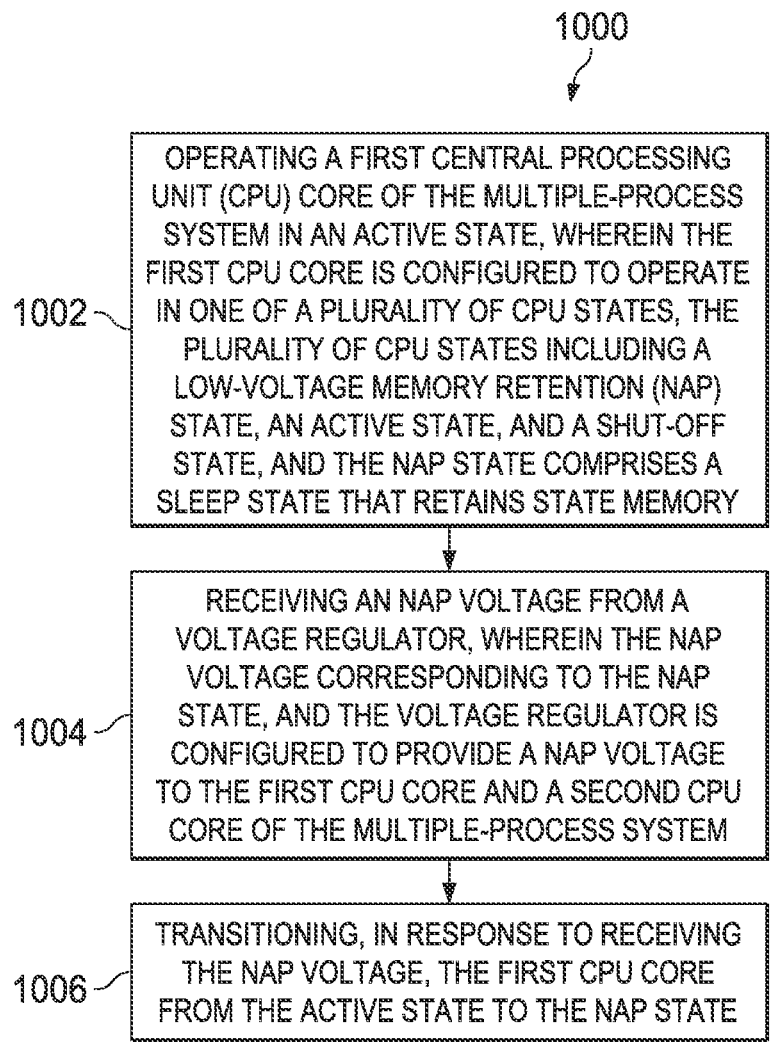
FIG. 10 is a flow chart illustrating an example method for CPU state transitions in an MP system according to an implementation.

FIG. 10 is a flow chart illustrating an example method 1000 for CPU state transitions in a multiple-processor system according to an implementation. The method 1000 may begin at block 1002, where a first central processing unit (CPU) core of the multiple-process system operates in an active state. The first CPU core is configured to operate in one of a plurality of CPU states. The plurality of CPU states includes a low-voltage memory retention (NAP) state, an active state, and a shut-off state. The NAP state includes a sleep state that retains state memory.

In some cases, the voltage regulator, the first CPU core, and the second CPU core are implemented on the same chip. In some cases, the voltage regulator is a low-dropout-voltage-regulator (LDO). In some cases, the voltage regulator is a capless voltage regulator. In some cases, the voltage regulator is configured to provide a bypass voltage to the first and the second CPU cores, and the bypass voltage corresponds to a transient state.

In some cases, the multiple-processor system is implemented in a 4-core architecture or an 8-core architecture. In some cases, the multiple-processor system is implemented in a big.LITTLE architecture. The multiple-processor system includes at least two big CPU cores and at least two little CPU cores. In some cases, the voltage regulator is configured to provide a NAP voltage to at least one big CPU core and at least one little CPU core. In some cases, the voltage regulator is configured to provide a NAP voltage to at least two big CPU cores, and the multiple-processor system further includes an additional voltage regulator that is configured to provide a NAP voltage to the at least two little CPU cores. In some cases, the multiple-processor system operates in ANDROID operating system (OS) or iOS. In some cases, the multiple-processor system includes a dynamic symmetric multiprocessing (SMP)-asymmetric multiprocessing (ASMP) switching system. In some cases, the multiple-processor system includes an SMP. In some cases, the multiple-processor system comprises an ASMP.

At block 1004, a NAP voltage is received from a voltage regulator. The NAP voltage corresponds to the NAP state. The voltage regulator is configured to provide a NAP voltage to the first CPU core and a second CPU core of the multiple-processor system.

In some cases, control signals are received from a digital NAP state controller. The control signals configure an output state of the voltage regulator and an output state transition sequence. The output state represents a combined CPU state of the first and the second CPU cores. The output state transition sequence includes a transition between different combined CPU states. In some cases, the output state is selected from a reduced set of combined CPU states.

At block 1006, in response to receiving the NAP voltage, the first CPU core transitions from the active state to the NAP state.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products. Furthermore, while the operations depicted in the drawings may indicate start and/or end points for the operations, implementations of the methods described in the disclosure are not restricted to the particular start and/or end point as illustrated. Other implementations may start and/or end at different points of the operations.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A multiple-processor system, comprising:
   a voltage regulator;
   a plurality of header switches;
   a controller connectable independently to each of the voltage regulator and the plurality of header switches, the controller being configured to generate one or more control signals to one or more of the plurality of header switches and the voltage regulator; and
   a plurality of central processing unit (CPU) cores, each of a plurality of CPU cores being independently connectable to a voltage source by at least one of a corresponding one of the plurality of header switches and the voltage regulator in accordance with a first control signal received from the controller, to configure the CPU core in a first of a plurality of CPU states, each of the plurality of CPU cores being switchable to another of the plurality of CPU states in accordance with a second control signal provided by the controller to the corresponding header switch or voltage regulator.

2. The multiple-processor system of claim 1, wherein at least one of the plurality of CPU cores is connectable to the controller through a corresponding state control switch.

3. The multiple-processor system of claim 2, wherein the controller is configured to send the second control signal to the state control switch through the voltage regulator, the voltage regulator being configured to provide a voltage signal to the state switch that is different from a supply voltage.

4. The multiple-processor system of claim 1, wherein each of the plurality of CPU cores is independently connectable to the voltage source through the voltage regulator and a corresponding one of a plurality of state control switches.

5. The multiple-processor system of claim 1, wherein at least one of the plurality of header switches is a block header switch.

6. The multiple-processor system of claim 1, wherein the plurality of CPU states comprise a shut-off state, an active state, and a low-voltage memory retention (NAP) state, each of the plurality of CPU states having an associated voltage that differs from the voltage of other CPU states.

7. The multiple-processor system of claim 6, wherein the NAP state corresponds to a state in which a NAP voltage provided to the CPU core has a lower value than a voltage provided when the CPU core is in an active state, the NAP voltage being sufficient to retain state information of the CPU core.

8. The multiple-processor system of claim 7, wherein each of the plurality of CPU cores is connectable to a cache when in an active state.

9. The multiple-processor system of claim 8, wherein the cache accessible by one of the plurality of CPU cores in an active state is located in another CPU core.

10. The multiple-processor system of claim 6, wherein the plurality of CPU states further comprise a transient state, and the voltage regulator is configured to provide a bypass voltage corresponding to the transient state.

11. The multiple-processor system of claim 1, wherein the voltage regulator and the plurality of CPU cores are implemented on the same chip.

12. The multiple-processor system of claim 1, wherein the voltage regulator is one of a low-dropout-voltage-regulator (LDO) or a capless voltage regulator.

13. A method for providing state transitions to a plurality of central processing unit (CPU) cores, the method comprising:
    generating, by a controller, a first signal to one or both of a voltage regulator and first header switch associated with a first CPU core to establish a first signal path to the first CPU core, wherein a voltage applied along the first signal path places the first CPU core in a first CPU state;
    generating, by the controller, a second signal to one or both of a voltage regulator and second header switch associated with a second CPU core to establish a second signal path to the second CPU core, wherein a voltage applied along the second signal path places the second CPU core in a second CPU state;
    generating, by the controller, a third signal to one or both of the voltage regulator and first header switch to establish a third signal path to the first CPU core, the third signal path being different from the first signal path, wherein a voltage applied along the third signal path places the first CPU core in a third CPU state.

14. The method of claim 13, wherein the first and second signals configure the first and second header switches in the same position.

15. The method of claim 13, wherein the first and second signals configure the first and second header switches in different positions.

16. The method of claim 15, wherein one of the first and third signals configures a state control switch associated with the first CPU core in an open position.

17. The method of claim 13, wherein each of the plurality of CPU cores is independently connectable to the voltage regulator through a corresponding state control switch.

18. The method of claim 13, wherein the header switch associated with the first CPU core is a block header switch, and the voltage applied along one of the first and third signal paths configures the block header switch to move between an open and a closed position.

19. The method of claim 13, wherein the first CPU state comprises one of a shut-off state, an active state, and a low-voltage memory retention (NAP) state.

20. The method of claim 13, wherein the voltage applied along one of the signal paths is a NAP voltage that causes a corresponding one of the plurality of CPU cores to operate in a NAP state and cause operation of a clock associated with the CPU core to stop.

21. The method of claim 20, further comprising accessing, by another of the plurality of CPU cores, a cache associated with the CPU core in a NAP state.

22. A user equipment (UE), comprising:
a controller connectable independently to a voltage regulator, and to each of a plurality of header switches, each of a plurality of control state switches, and to each of a plurality of central processing unit (CPU) cores;
the controller being configured to:
generate a first signal to one or both of the voltage regulator and the first header switch associated with a first CPU core to establish a first signal path to the first CPU core;
generate a second signal to one or both of the voltage regulator and the second header switch associated with a second CPU core to establish a second signal path to the second CPU core; and
generate a third signal to one or both of the voltage regulator and first header switch to establish a third signal path to the first CPU core, the third signal path being different from the first signal path;
each of the first and second CPU cores being independently connectable to a voltage source through the voltage regulator and controller to place each of the respective first and second CPU cores in one of a plurality of CPU states.

23. The UE of claim 22, wherein the first and second signals configure the first and second header switches in the same position.

24. The UE of claim 22, wherein the first and second signal configure the first and second header switches in different positions.

25. The UE of claim 22, wherein one of the first and third signals configures a state control switch associated with the first CPU core in an open position.

26. The UE of claim 22, wherein the header switch associated with the first CPU core is a block header switch, and the voltage applied along one of the first and third signal paths configures the block header switch in an open position.

27. The UE of claim 22, wherein the plurality of CPU states comprises a shut-off state, an active state, and a low-voltage memory retention (NAP) state.

28. The UE of claim 22, wherein the voltage applied along one of the signal paths is a NAP voltage that causes a corresponding one of the plurality of CPU cores to operate in a NAP state and cause operation of a clock associated with the CPU core to stop.

29. The UE of claim 28, wherein a cache associated with the CPU core in the NAP state is accessible by another of the plurality of CPU cores.

* * * * *